Figure 2:
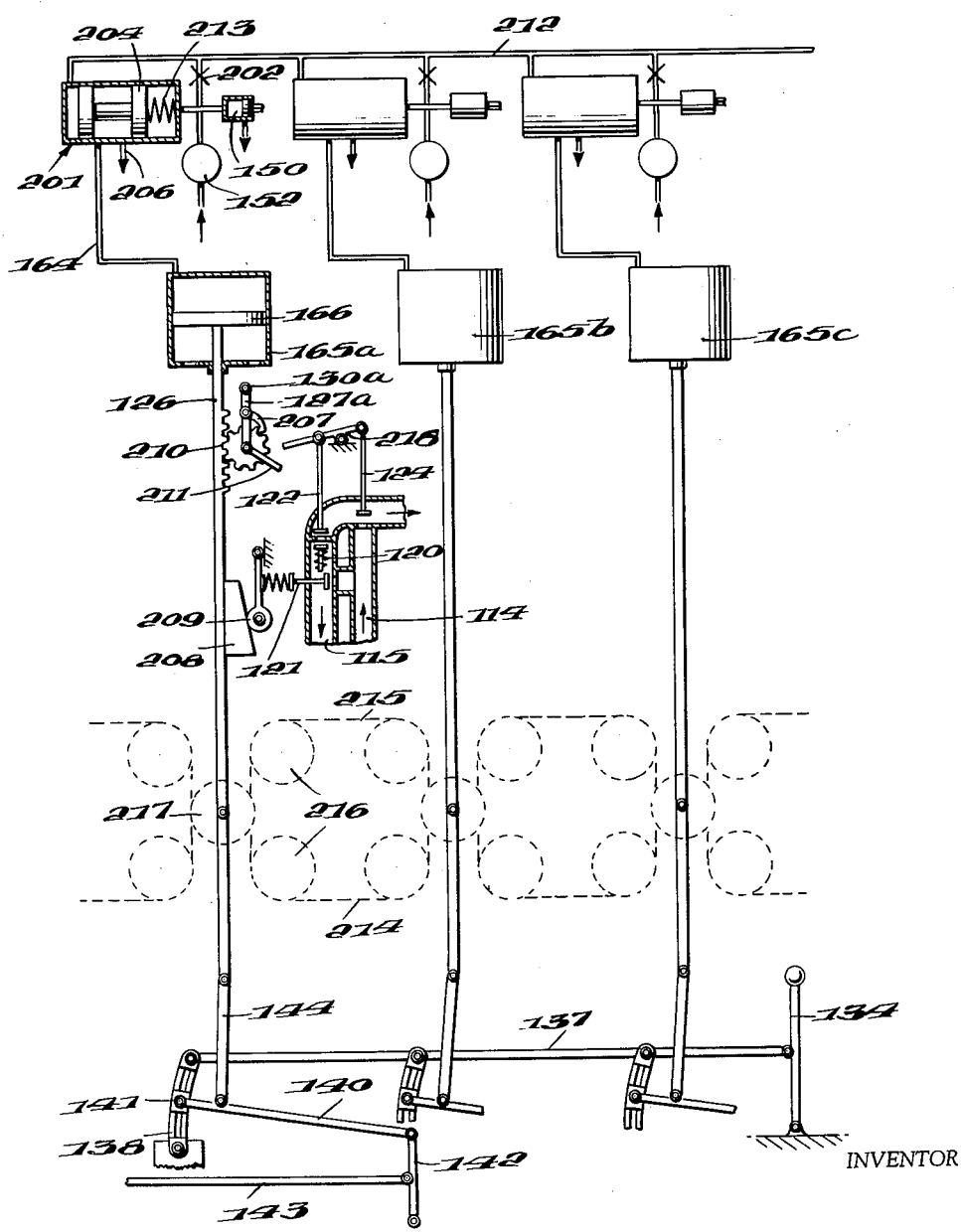

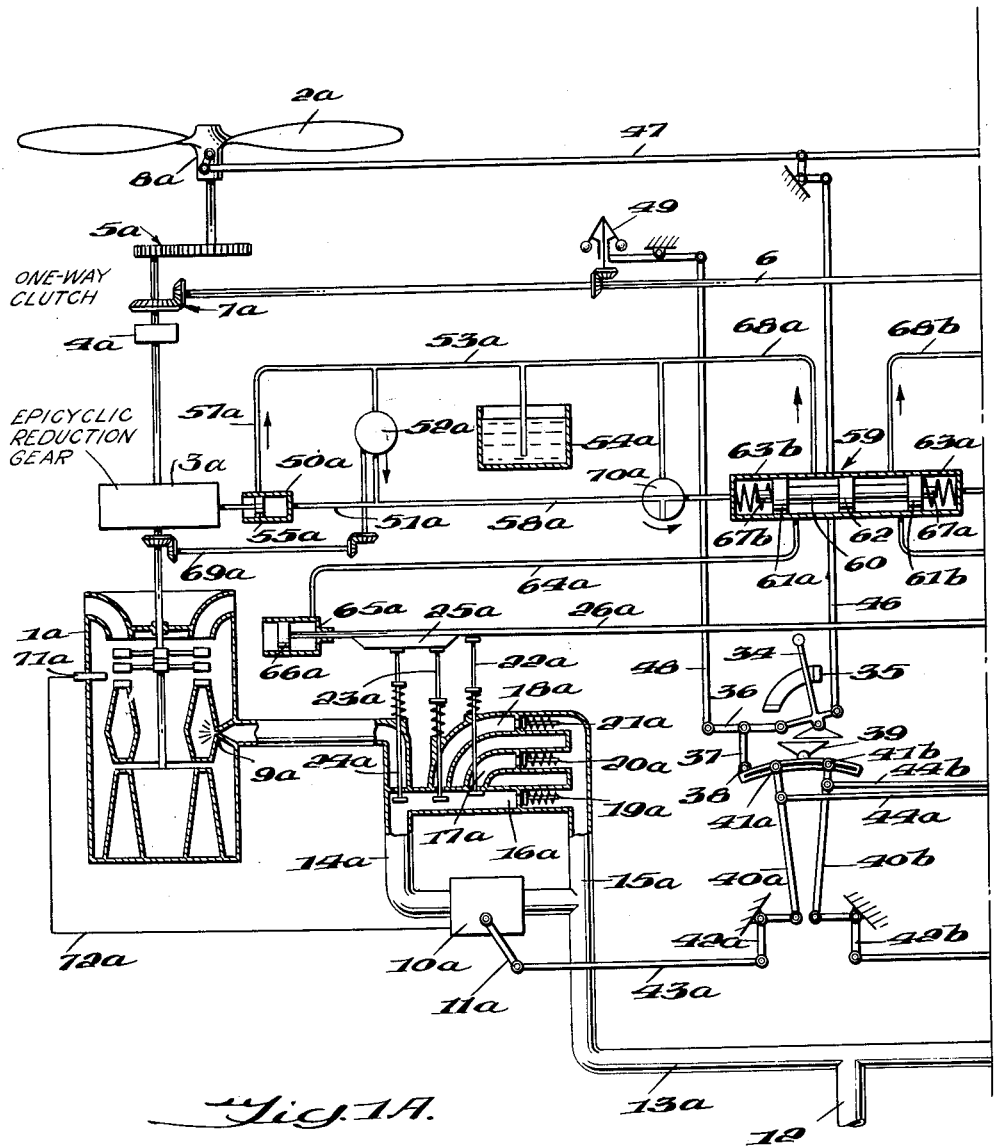

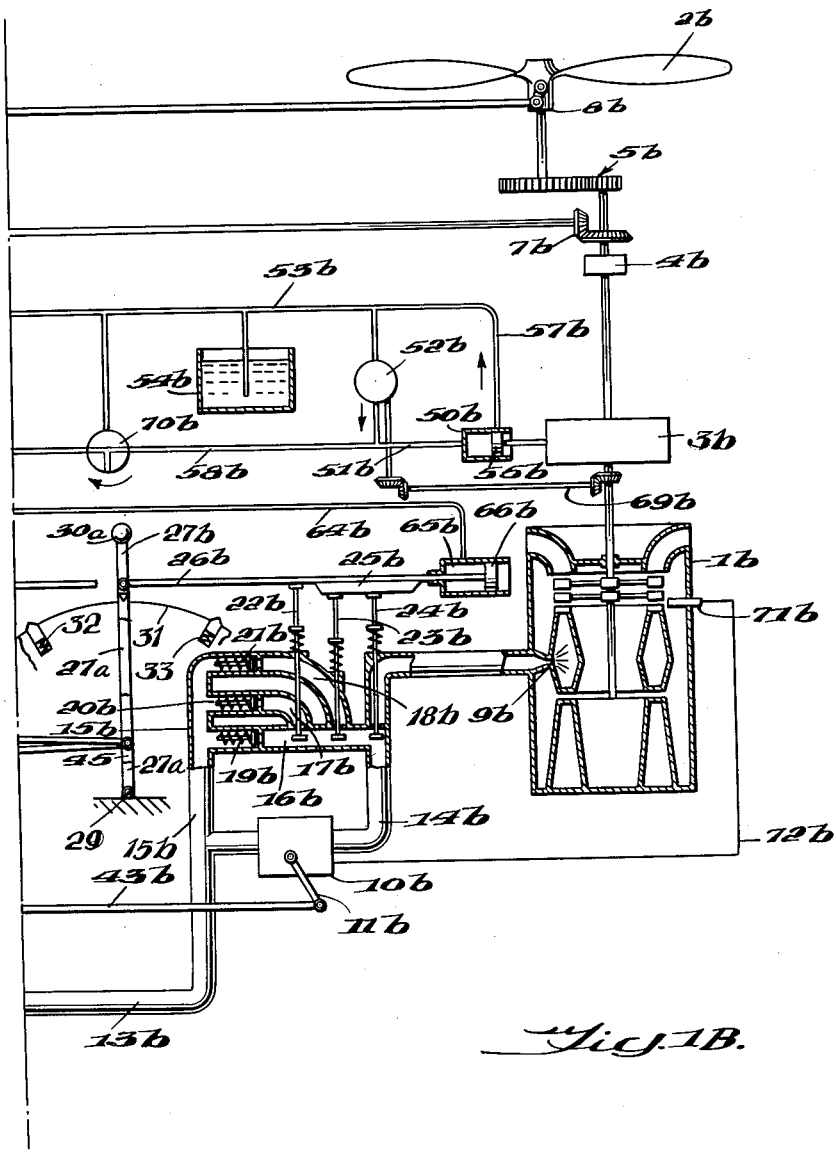

May 1, 1962 R. HAFNER 3,032,295
AIRCRAFT ARRANGED FOR VERTICAL TAKE-OFF AND LANDING
Filed Sept. 18, 1958 3 Sheets-Sheet 3

INVENTOR
RAOUL HAFNER
BY Bailey, Stephens & Huettig
ATTORNEYS

United States Patent Office 3,032,295
Patented May 1, 1962

3,032,295
AIRCRAFT ARRANGED FOR VERTICAL
TAKE-OFF AND LANDING
Raoul Hafner, Bristol, England, assignor to Bristol Aircraft Limited, Bristol, England, a British company
Filed Sept. 18, 1958, Ser. No. 761,721
Claims priority, application Great Britain Sept. 25, 1957
14 Claims. (Cl. 244—53)

This invention relates to power plants for helicopters and other aircraft capable of taking-off and landing vertically, of the kind in which for reasons of safety two or more engines are employed having a total possible power output which is greater than is necessary for normal flight conditions, so that if one engine should fail completely or partially the power output of the remainder can be increased to make good the deficiency at least up to that sufficient to sustain the aircraft in hovering flight under the most adverse conditions. These most adverse conditions are a full load and still air. The need for sustaining the aircraft is of course principally of importance during take-off and landing.

In the design of a power plant of this kind certain closely allied problems are encountered for which the present invention aims to provide solutions.

A power plant of the kind described may include engines which only or mainly produce power for conversion into thrust by auxiliary means such as sustaining rotors, propellers, ducted fans and the like. It is convenient or necessary for the maintenance of proper control, and in the interest of avoiding excessive weight, that there should be a common thrust-producing system to which one or more of the engines may supply power. The common thrust producing system includes at least one rotary member adapted to convert torque into thrust, that is to say, the rotor, propeller or fan system, and there is torque-transmitting means operatively connecting the engines to the common thrust producing system.

According to the present invention the thrust producing system is made only of sufficient robustness to transmit the maximum power required in normal flight, i.e. the power necessary to produce a designed rate of climb with a full load, and in consequence is unable to endure transmission of the maximum power of which the engines are together capable, and the power plant comprises, in addition to the engines, a control system including means which prevents the total power being delivered by the engines from exceeding the maximum which the thrust-producing system can endure.

Preferably this means is wholly mechanical, in the interests of reliability.

Preferably the control system includes means, such as a pilot's manual control, for selecting the total power output of the engines, and the means for preventing the total power from exceeding the maximum which the thrust-producing system can endure is independent of the means for selecting the total power.

In a preferred arrangement for an aircraft having N engines the control system includes, for each engine, a fuel rate controller which is self-compensating in relation to ambient conditions and is provided with a regulator for selecting power output, a fuel shut-off device, and and a fuel rate limiter which is directly actuated by fuel going to the engine and which has means for adjustment to limit the fuel rate to any one of a plurality of maxima, one of which corresponds to a power out from the engine equal to $$\frac{1}{N}$$

of the maximum power which the thrust-producing system can endure and another of which corresponds to a power output from the engine equal to the lesser of the maximum power which the engine or parts driven only by that engine can endure for short periods, and the maximum power which the thrust-producing system can endure.

Preferably also the control system includes, for each engine, means for detecting faulty operation of that engine and thereupon reducing the fuel supply to that engine and increasing the fuel supply to at least one other engine. By faulty operation is meant a departure from normal running of sufficient magnitude and persistence to indicate uncertainty as to the ablity of the engine to continue to supply power.

The majority of faults will result in the faulty engine producing a power below the average power of the engines. It may be convenient, especially when the engines run at a fixed or substantially fixed speed in relation to one another to detect this state of affairs by comparison of torque rather than by comparison of power. Accordingly a preferred control system includes means for detecting a fall in the power or torque supplied by an engine below the average power or torque of the engines supplying the thrust-producing system, and means responsive to that fall exceeding a predetermined amount for reducing the fuel supply to the engine giving the reduced power or torque and simultaneously increasing the fuel supply to at least one other engine to produce increased power or torque. If there are only two engines the effect of comparing their powers with their average power may be obtained by a direct comparison of their powers.

To protect the engines in such a system against the effects of continued running with a fault which does not of itself substantially reduce the power of the engine, for example overheating of some part of the engine, the control system may include means responsive to the development of such faults and arranged to cause, upon occurrence of such a fault, reduction of power sufficient to be detected by the means responsive to loss of power.

Preferably there is a main power regulating member, an individual power regulating member associated with each engine, a variable-ratio transmission linking each of the individual regulating members to the main regulating member, and adjusting means for the transmissions which is responsive to the power or torque developed by the engines, so that when the power or torque developed by one engine falls more than a predetermined amount below the average power or torque of the engines, the ratio of the transmission associated with each other engine is varied so as to increase the power output of each other engine.

The transmission between the main regulating member and each individual regulating member may be such that the ratio of the displacement of the main regulating member to the algebraic sum of the displacements of the individual regulating members is constant.

The invention is illustrated by the accompanying drawings in which:

FIGURES 1A and 1B show together schematically a plant with two gas turbine engines for a twin-rotor helicopter; and FIGURES 2 and 3 show schematically parts of plants with more than two engines.

The plant shown in FIGURE 1 comprises two gas turbine engines 1a and 1b each driving a lifting rotor 2a and 2b through a first epicyclic reduction gear 3a and 3b, a one-way clutch 4a and 4b and a final reduction gear 5a and 5b. The two rotors are permanently connected together by a synchronising shaft 6 and bevel gears 7a and 7b arranged between the one-way clutches and the final reduction gears, and are provided with devices 8a and 8b for adjusting the pitch of the blades collectively.

The two rotors 2a and 2b, the reduction gears 5a and 5b, the synchronising shaft 6 and the bevel gears 7a and 7b constitute a common thrust producing system to which power is supplied by either or both the engines 1a and 1b. The engines 1a and 1b are of such power that either of them alone could maintain the helicopter in hovering flight, for short periods, under the most adverse landing and take-off conditions. When both engines are serviceable they could thus supply a total power substantially in excess of normal flying requirements. To be capable of handling this extra power the common thrust producing system would have to be strengthened and possibly enlarged, but in view of the additional weight involved this is not economically desirable. Therefore, according to this invention, instead of increasing the load capacity of the thrust-producing system, the plant is provided with a control system which limits the total power which may be produced to that necessary for normal flying requirements.

By way of numerical example, in an aircraft the normal flying requirements of which demand a total power of 1800 B.H.P., the most adverse landing and take-off case might require a minimum of 1600 B.H.P. to maintain hovering flight. Two engines each capable of developing 1600 B.H.P. for short periods would therefore be suitable, and the control system would be required to prevent more than a total of 1800 B.H.P. being developed, that is to say, with both engines running at equal power they would be limited to 900 B.H.P. each. The engines may in fact be designed for a continuous rating of only 900 B.H.P., the figure of 1600 B.H.P. being a rating for short periods of say 2½ minutes. This period is determined principally by considerations of overheating. Thus each lifting rotor 2a and 2b and each final reduction gear 5a and 5b would be designed for 900 B.H.P. and the synchronising shaft 6 and the bevel gears 7a and 7b would be designed for 800 B.H.P. The first epicyclic reduction gears 3a and 3b and the one-way clutches 4a and 4b still require to be designed for the full power of their respective engines, namely 1600 B.H.P.

In the design of the mechanical parts of a helicopter one cannot afford to provide a substantial reserve of strength beyond the normally required maximum, and the effect of overloading such parts as the rotors, shafting and gearing which sustain the aircraft in the air could therefore be catastrophic. The maintenance of adequate safety in a system as herein described consequently demands that the power-limiting functions be performed by devices of such simplicity that their complete reliability can be guaranteed. With the large powers in question the only practical way of limiting the power supplied by an engine is by control of the supply of fuel to it. It is however well known that the fuel metering systems of engines, and of gas turbine engines in particular, have acquired considerable complexity in response to demands for self-compensation in relation to ambient conditions and in the avoidance of operating conditions in the engines which are detrimental to their structure. This complexity increases the risk of a fault developing in the system such as would allow an engine to produce more power than would normally correspond to the setting of the power regulating member, and it is therefore desirable, having regard to the catastrophic results which could follow such a power increase, to provide an overriding fuel rate limiter which, by reason of its limitation to that one function can be made extremely simple and free from the possibility of derangement.

In the case of a gas turbine engine the fuel supply system may, and commonly does, comprise a number of sprayers by means of which liquid fuel is sprayed into the combustion zone or zones of the engine, the quantity of fuel passed by the sprayers being a function of the pressure of the fuel which is supplied to them. Such a system readily lends itself to the addition of a very simple fuel rate limiter in the form of a pressure relief valve which prevents the pressure on the upstream side of the sprayers exceeding a selected value to which the relief valve is set and therefore correspondingly limits the maximum rate of fuel into the combustion zone or zones of the engine, and with it the power which the engine can develop. Where, as in accordance with the present invention, it is required to be able to adjust the fuel rate limiter to either of two or more rates this may be achieved either by adjustment of a single pressure relief valve or by the provision of as many separate relief valves as there are rates required, blocking means being provided to prevent operation of those valves having a pressure setting lower than that for the time being required. A control system embodying fuel rate limiters of the last-mentioned kind is shown in FIGURE 1 and will now be described.

Since in this system many of the parts are duplicated for the two engines 1a and 1b they will be identified by the same numerical references with the addition of a suffix a for those parts pertaining to the engine 1a and a suffix b for those parts pertaining to the engine 1b. Parts identified by a plain numeral are common to the systems of both engines. A preliminary description of the engine systems will be confined to that of the engine 1a, to save duplication of reference numerals, but with exchange of suffixes is equally applicable to the system of the engine 1b.

The fuel supply system of the engine 1a includes fuel pumping and metering devices of any desired kind capable of supplying fuel at controlled pressure to a sprayer system 9a of the engine, the devices being referred to collectively as a fuel rate controller and shown diagrammatically as a "box" 10a having a regulating lever 11a. The controller 10a draws fuel through pipes 12 and 13a from a tank, not shown, and supplies it through a pipe 14a to the sprayer system 9a. Branching from the pipe 14a from a position between the fuel rate controller 10a and the sprayer system 9a is a by-pass pipe 15a returning to the intake side of the controller 10a and comprising three loops 16a, 17a and 18a containing respectively pressure relief valves 19a, 20a and 21a. The relief valve 19a is set to prevent the pressure of fuel in the pipe 14a exceeding a value at which the rate of flow through the sprayer system 9a is sufficient to provide the maximum power for which the engine 1a and the transmission driven only by the engine 1a, that is to say more particularly the reduction gear 3a, is designed. In the numerical example previously quoted this power was 1600 B.H.P., but it could be increased to not more than the 1800 B.H.P. which the two rotors 2a and 2b and the reduction gears 5a and 5b are capable of taking between them. In this case the capacity of the synchronising shaft 6 and the bevel gears 7a and 7b would of course have to be increased to 900 B.H.P.

The relief valve 20a is set to prevent the pressure of fuel in the pipe 14a exceeding a value at which the rate of flow through the sprayer 9a is sufficient for idle running of the engine, while the relief valve 21a limits the pressure to that necessary to provide half the maximum normal flight power, that is to say 900 B.H.P. in the example. To enable operation of the relief valves 20a and 21a to be blocked when not required, blocking valves 22a and 23a are provided in the loops 17a and 18a. A shut-off valve 24a in the pipe 14a permits the engine 1a to be stopped by stopping the flow of all fuel to it. The valves 22a, 23a and 24a are operated in unison by a cam 25a on a rod 26a connected to one part 27a of a split control lever composed of two parts, 27a, 27b, which is pivotally mounted at 29. The two parts of the lever 27a, 27b are each provided with one half of a hand grip such as 30a, the two halves coming together and forming a whole so that the two parts of the lever may be operated together for normal control movements or may be separated, for examply by releasing a catch holding them together, to enable both engines to be shut down together as will presently be described. The separation is only allowed to take place in one direction, that is to say the parts are prevented from passing one another. The lever 27a, 27b moves in a quadrant 31 provided with spring detents 32 and 33 which limit its end positions but can be overcome by the application of extra force to allow an extension of the range in each direction. When the two parts 27a and 27b are together and in a mid position in the quadrant 31, the cams 25a and 25b hold both the shut-off valves 24a, 24b open and both the blocking valves 23a, 23b open, but allow the blocking valves 22a and 22b pertaining to the idle running relief valves 20a and 20b to close. Consequently the relief valves 21a, 21b set for the next higher fuel pressure are in command and permit a fuel flow rate to each engine only up to that which will produce half the maximum normal flight power. Below this fuel rate, power is controlled by movement of the regulating levers 11a, 11b as will presently be described.

If the lever is moved bodily to the left until stopped by the detent 32 of the quadrant 31, the cam 25a allows the blocking valve 23a to close while the cam 25b opens the blocking valve 22b, leaving the valves 23b and 24b open. Consequently the engine 1b is shut down to idling condition while the allowed fuel flow rate for the engine 1a is increased to that of the setting of the relief valve 19a, namely either to the designed maximum power of the engine or to the maximum normal flight power if the engine is designed to produce that power. By moving the lever beyond the detent 32 the shut-off valve 24b is closed so that the engine 1b is shut down completely. The shut-off valve 24a remains open so that the running of engine 1a at full power is unaffected. Conversely, moving the lever to the right up to the detent 33 shuts down the engine 1a to idling condition and allows increased fuel flow to the engine 1b, while moving the lever beyond the detent shuts down the engine 1a completely. If the two parts of the lever 28 are separated and moved towards their respective ends of the quadrant 31 both engines can be shut down to idling condition or completely. Normal procedure on the occurrence of a fault is to shut the engine down initially to the idling condition, and if investigation then shows that the fault cannot be remedied in flight the engine is shut down completely.

During normal operation of the plant, the parts of the lever 27a, 27b remain together, and the system including the cams 25a, 25b, rods 26a, 26b and the lever constitutes a mechanical transmission connecting the shut-off valves 24a, 24b and the blocking valves 22a, 22b, and 23a, 23b in a manner permitting permutations of the settings of the valves in one of which, when the lever is centrally placed in the quadrant 31, the total of the allowed fuel rates is equal to that required to produce the maximum normal flight power and in another two of which, when the lever is in either end position in the quadrant 31, fuel is shut off from one of the two engines, the fuel rate limiter for the other engine being set to allow a maximum power, not exceeding the maximum normal flight power, for which the engine or parts such as the reduction gears 3a, 4a driven only by that engine are designed.

Each of the individual power regulating levers 11a, 11b is connected to a main power regulating lever 34 having a range of movement limited by a quadrant 35, by a transmission including a differential balance lever 36, and a link 37 connected at one end to an intermediate point of the lever 36 and at its other end to an arcuate slide 38 tilting about a fixed pivot 39. A link 40a slidably engages the slide 38 at one end 41a and is pivoted to a bellcrank lever 42a at the other end, and a link 43a connects the other arm of the bellcrank lever to the individual power regulating lever 11a. Each half of the arcuate slide 38 together with one of the links 40a, 40b constitutes a variable ratio transmission the velocity ratio of which is variable from zero when the end 41a, 41b of the link 40a, 40b is adjacent the pivot 39 to a maximum when the end 41a, 41b of the link is at an end of the arcuate slide. The ends 41a, 41b are maintained at a fixed distance apart equal to half the length of the arcuate slide 38 by a pair of links 44a, 44b which connect the links 40a, 40b to a lever 45 which is sandwiched between the parts 27a, 27b of the control lever 28 and mounted on the same pivot 29. The links 44a, 44b are of such length that the ends 41a, 41b of the links 40a, 40b are equally spaced from the pivot 39 of the arcuate slide when the control lever 28 is centrally positioned in the quadrant 31 and holds the lever 45 in a corresponding central position.

With the lever 45 in this position and the main power regulating lever 34 in its minimum power position, as drawn, the individual power regulating levers 11a, 11b are both in their minimum power positions. Movement of the main power regulating lever 34 in a power-increasing direction now causes the arcuate slide 38 to tilt in an anticlockwise direction, moving both the individual power regulating levers 11a, 11b equally in a clockwise direction towards their maximum power positions shown in dotted lines. By making the cams 25a, 25b of such length that a range of movement of the control lever 28 is permitted without change in setting of the valves 22a, 22b, 23a, 23b and 24a, 24b, movement of the control lever 27a, 27b in this range may be used to control within limits the power split as between the two engines, the total power developed remaining substantially constant. When the control lever is moved to either end of the quadrant 31 so that one engine is shut down, the movement transmitted from the lever 45 to the links 44a, 44b moves the end 41a, 41b pertaining to the shut-down engine to a position adjacent the pivot 39 so that the corresponding individual power regulating lever 11a, 11b is returned to and held in its zero power setting. At the same time the other link end 41a, 41b is moved to the end of the arcuate slide 38 so that the transmission ratio as between the main regulating lever 34 and the individual regulating lever 11a, 11b of the engine still running is doubled and the latter regulating lever is moved to a position corresponding to twice the power (the capacity of the engine permitting) that was previously being developed. It will be understood therefore that in the event of a fault developing in either engine, movement of the control lever in the appropriate direction shuts down that engine and simultaneously opens up the other engine to maintain the total power constant so far as may be within the capacity of the engine still running.

The lever 34, in known manner simultaneously controls the pitch of the rotor blades collectively through links 46 and 47 connected to the pitch controls 8a and 8b. The end of the differential balance lever 36 opposite the end connected to the lever 34 is connected by a link 48 to a speed governor 49 driven from the synchronising shaft 6. The interconnection of the pitch and power controls minimises the corrective action to be performed by the governor.

FIGURE 1 also shows a system for operating the control lever 27a, 27b automatically in response to a fall in the power of one engine relatively to that of the other. The system shown is hydraulic but other fault detection and servo power systems may be used as will readily be understood. The system is symmetrical and therefore, as before, only the part relating to the engine 1a will be specifically described.

The planetary reduction gear 3a is provided in well known manner with one or more hydraulic torquemeter cylinders 50a which are supplied with fluid through a pipe 51a by a pump 52a which is driven from the engine 1a, as indicated by the chain dotted line 69a, and draws the fluid through a pipe 53a from a reservoir 54a. The pistons 55a of the cylinders oppose the reaction produced upon the annulus of the reduction gear by the torque transmitted, and in moving outwardly uncover ports through which the fluid escapes and returns through a pipe 57a to the low pressure side of the system. Consequently a pressure is maintained in the cylinder and the pipe 51a which is proportional to the torque being transmitted by the reduction gear. From the pipe 51a a branch 58a is taken to one end of the casing of a balance valve 59 containing a shuttle 60 having three lands 61a, 61b and 62, the middle land 62 being provided to keep the hydraulic circuits pertaining to the two engines separate. The shuttle 60 is normally centralised in the casing by two springs 63a, 63b. From a port spaced a little inwardly of the land 61a a pipe 64a extends to a cylinder 65a containing a piston 66a attached to the cam rod 26a. By means of an abutment 67a the shuttle is allowed a movement against the spring 63a such that the port is uncovered by the outer edge of the land 61a so that fluid can pass from the pipe 58a into the pipe 64a to operate the piston 66a. From another port placed beyond the displaced position of the land 61a a pipe 68a returns to the low pressure side of the system.

When the plant is operating normally on both engines the control lever 27a, 27b will be centrally positioned, and, the torques transmitted by the reduction gears 3a and 3b being equal, the valve shuttle 60 will be balanced in its mid position in which the cylinders 65a and 65b are connected by pipes 64a, 64b, 68a and 68b to the low pressure sides of the respective hydraulic systems, so that the control lever could be moved manually if desired, for example for the purpose of adjusting the power split between the engines, or the two parts of the lever 28 could be separated to shut down both engines. During such adjustments the shuttle 60 of the balance valve will be displaced somewhat from its mid position, but not sufficiently to admit pressure fluid from the pipe 58a or 58b into the pipe 64a or 64b. If however a fault develops in one of the engines, say engine 1b, causing its torque to drop below that of the other engine to an extent sufficient to cause displacement of the shuttle 60 to the right hand end of its permitted travel, then fluid under pressure will be admitted to the cylinder 65a of the engine 1a which is still running normally with the result that both parts of the control lever 27a, 27b are moved to the left until stopped by the detent 32 so that the blocking valve 22b of the faulty engine is opened to reduce the fuel supply to idling condition and the blocking valve 23a of the serviceable engine is closed, thereby permitting the latter to develop more power. At the same time the end 41b of the link 40b is moved to adjacent the pivot 39 of the arcuate slide 38 and the end 41a of the link 40a is moved towards the left hand end of the arcuate slide 38. This latter movement has the effect that whatever the angular opening of the individual power regulating lever 11a was before the failure occurred, it is substantially doubled when the protective system operates, and the engine 1a therefore runs either at a power sufficient to make good the power lost by the shutting down of the engine 1b, or, if this is beyond its capacity, it will run at its full capacity, which is sufficient to maintain the aircraft in hovering flight.

Where the relation between angular displacement of the individual power regulating lever from its zero power position and the power developed by the engine is substantially linear it is desirable, to avoid changes in power as the control lever 28 is moved, to arrange the transmission between the main power regulating lever 34 and the individual regulating levers 11a and 11b so that the ratio of the displacement of the main lever to the algebraic sum of the displacements of the individual levers is constant. Where the relation is not linear this may be compensated in the transmission linkage.

If is is found on investigation that the fault in the engine reduced to idling power can be corrected, load may be transferred to it, when it is again running satisfactorily, by moving the control lever 28 back to its central position. To allow such return movement to be made, three-way overridding valves 70a, 70b are provided permitting the end chambers of the balance valve 59 to be disconnected from the pressure supply pipes 58a, 58b and connected to the low pressure sides of the hydraulic systems. When this has been done, pressure is released from whichever of the cylinders 65a, 65b was under pressure and the pilot may then return the control lever 28 to its mid position for the resumption of normal operation. The overriding valves 70a, 70b are preferably interconnected for operation in unison and a transmission may be arranged between them and the lever 45 so that they are moved automatically into their overriding settings whenever the control lever reaches either of the detent positions in the quadrant 31. Protection of the engines against the effects of continued running with a fault which does not of itself reduce the torque of the engine may be obtained by the provision of sensing devices sensitive to the faulty condition and controlling devices overriding the action of the individual power regulating levers. By way of example, the engines 1a and 1b are shown provided with temperature sensors 71a, 71b sensitive to the gas temperature at the inlets to the turbines. These sensors are connected by signal transmissions 72a, 72b to overriding devices in the fuel rate controllers 10a, 10b so that the fuel supply rate is reduced in the event of an excessive temperature being recorded. Should the fault be so severe as to unbalance the torques of the two engines beyond the difference permitted by the valve 59, the automatic system will operate to reduce the faulty engine to idling power and to increase the power of the other engine.

In the system shown in FIGURE 2, for a plant comprising more than two engines, those components which correspond substantially to components in FIGURE 1 are given the same number with the prefix 1 and those components which differ are given numbers with the prefix 2. The components for one engine are shown in detail. Each engine has a similar set of components associated with it. There is a single common main power regulating lever 134. There are also control lever parts 127, one for each engine, which are preferably arranged close together on a common shaft so that their knobs 130 can be moved either as one or individually.

Movement of a rod 126 serves to vary the ratio of the transmission 137, 140, 141, 142, 144 between the main power regulating lever 34 and the individual power regulating link 143.

Movement of the rod 126 also serves by means of a cam 208 and a follower 209 to vary the loading of the spring of a fuel relief valve 121, controlling release of fuel from a fuel passage 114 to a relief passage 115. The position shown corresponds to limitation to normal power. Upward movement of the rod 126 permits an increasing degree of additional power, which in practice will be for short periods of emergency. Downward movement of the rod reduces the power limit. The lever part 127 is connected to the rod 126 by a rack and pinion 210, with a spring-loaded detent 207 coupling the lever part 127 to the pinion. When the lever 127 has come to the end of its normal travel to the left, as seen in FIGURE 2, additional pressure on the knob 130 will cause the detent to disengage, and further movement of the knob will cause an arm 211 to engage a rocker 218 and first open a stop valve 122 controlling an idling fuel pressure relief valve 120 and then close a stop valve 124 and so stop the engine.

The rod 126 also carries a piston 166 in a cylinder 165. A pump 152 delivers fluid to a cylinder 150, the pressure in which depends on the torque delivered by the engine. This cylinder is connected through a restriction 202 to a manifold 212. The pressure in this manifold is a measure of the average torque of all the engines. There is a pilot cylinder 201 having its left-hand end connected to the manifold 212 and its right-hand end to the cylinder 150. If the torque of the engine falls a predetermined amount below average, a piston 204 is displaced to the right against a spring 214 and connects the top of the cylinder 165 to the mainfold 212 through a pipe 164. Thereupon the rod 126 is forced downwards.

The various rods 126 are interconnected by a displacement averaging mechanism. As an example each rod may carry two pulleys 217, there being two endless cords 214, 215 which run on the pulleys and on guide pulleys 216 with fixed axes. Thus downward movement of one rod 126 is accompanied by upward movement of one or more others. Likewise any voluntary upward movement of one rod 126 is necessarily accompanied by downward movement of one or more others. This mechanism performs the dual function of increasing the power of other engines upon failure of one and of positively limiting the total power by simple mechanical means. In practice movement of a rod 126 will cause movement of that or those of the other rods which experience least resistance. The rods 126 can thereafter be adjusted by hand to give a desired division of power among the engines.

As an alternative, a system of racks, pinions and differential gearing can be used to interconnect the rods. FIGURE 3 shows one such system for a plant with four engines. The four rods 126a, 126b, 126c and 126d associated with the four engines each have a rack section engaging one of four pinions 219. Each of these pinions is integral with a bevel gear 220. Pairs of the bevel gears 220 co-operate with bevel gears 221 on pins 222 integral with sleeves 223. The components thus far described thus constitute two differential gears. The sleeves 223 extend axially out of these differential gears and are connected to bevel gears 224 of a third differential gear. These bevel gears 224 engage bevel gears 225 on pins 226 which are fixed to a central stationary shaft 227. By means of this mechanism the algebraic sum of the movements of the four rods 126a, 126b, 126c and 126d into or out of the plane of the figure is maintained constant.

If an engine is to be restarted, the lever 127 is coupled to its pinion and them moved to the right against the resistance of the pressure in the upper part of the cylinder 165. When the engine torque has risen to average, the piston 204 in the pilot cylinder 201 is returned to the left by the spring 213 and so the top of the cylinder 165 is connected to drain at 206. Thereupon the lever 127 can be released.

I claim:

1. An aircraft having therein a plurality of engines, a thrust-producing system adapted to exert vertical upward thrust on the aircraft and including at least one rotary member adapted to convert torque into thrust, torque-transmitting means operatively connecting said engines to said thrust-producing system to impart power thereto, said engines having a total power output available to the thrust-producing system which is sufficient with any one engine stopped to sustain the aircraft in hovering flight under full load in still air, at least for short periods, said thrust-producing system having a limiting strength enabling it to transmit power only up to a limiting power which is sufficient for vertical take-off and vertical landing of the aircraft but less than the total of the maximum power outputs of all said engines, and control system responsive to engine conditions and operatively connected to said engines for automatically limiting the power outputs of said engines to prevent the combined total of the power outputs of said engines from exceeding said limiting power.

2. An aircraft according to claim 1 in which the control means for preventing the total power being delivered by the engines from exceeding the maximum which the thrust-producing system can endure is mechanical.

3. An aircraft according to claim 1 in which the control system includes means for selecting the total power output of the engines, and in which the means for preventing the total power from exceeding the maximum which the thrust-producing system can endure is independent of the means for selecting the total power.

4. An aircraft according to claim 3 having N engines, in which the control system includes, for each engine, a fuel rate controller which is self-compensating in relation to ambient conditions and is provided with a regulator for selecting power output, a fuel shut-off device, and a fuel rate limiter which is directly actuated by fuel going to the engine and which has means for adjustment to limit the fuel rate to any one of a plurality of maxima, one of which corresponds to a power output from the engine equal to $$\frac{1}{N}$$

of the maximum power which the thrust-producing system can endure and another of which corresponds to a power output from the engine equal to the lesser of the maximum power which the engine or parts driven only by that engine can endure for short periods, and the maximum power which the thrust-producing system can endure.

5. An aircraft according to claim 4 in which the fuel rate limiter responds to the pressure of fuel between the fuel rate controller and the engine.

6. An aircraft according to claim 5 in which the fuel rate limiter consists of two or more fuel relief passages, each controlled by a pressure relief valve, the settings of the relief valves being different and the passage or passages other than that controlled by the pressure relief valve set for the highest pressure being also controlled by a stop valve.

7. An aircraft having therein a plurality of engines, a thrust-producing system disposed to exert vertical upward thrust on the aircraft and including at least one rotary member adapted to convert torque into thrust, torque-transmitting means operatively connecting said engines to said thrust-producing system to impart power thereto, said engines having a total power output available to the thrust-producing system which is sufficient with any one engine stopped to sustain the aircraft in hovering flight under full load in still air, at least for short periods, and a control system which includes a main power regulating member, an individual power regulating member associated with each engine, a variable-ratio transmission linking each of the individual regulating members to the main regulating member, and adjusting means for the transmissions which is responsive to a factor chosen from the power and the torque developed by the engines, and operative, when the factor developed by one engine falls more than a predetermined amount below the average factor of the engines, to vary the ratio of the transmission associated with each other engine so as to increase the power output of each other engine.

8. An aircraft according to claim 7 in which the ratio of the displacement of the main regulating member to the algebraic sum of the displacements of the individual regulating members remains constant throughout all variations of the ratios of the transmissions.

9. An aircraft according to claim 7 including a rotary thrust-producing system with variable pitch blades and pitch control mechanism therefor connected to the main power regulating member.

10. An aircraft according to claim 3 in which the control system provides for a person to cause any one engine to idle, any one engine to be stopped, all the engines to idle, and all the engines to be stopped.

11. An aircraft according to claim 7 in which the control system includes a manual control member composed of as many parts as there are engines, the parts being movable together to cause the ratios of the transmissions associated with all the engines to be varied simultaneously, and being movable separately to cause each of the engines to idle or stop.

12. An aircraft according to claim 1 in which the engines are gas turbines.

13. An aircraft according to claim 1 in which the thrust-producing system is one or more rotary wing systems.

14. An aircraft according to claim 13 in which there are two rotary wing systems and two engines.

References Cited in the file of this patent

UNITED STATES PATENTS

| | | |
|---|---|---|
| 2,396,321 | Goddard | Mar. 12, 1946 |
| 2,540,991 | Price | Feb. 6, 1951 |
| 2,579,959 | Petersen | Dec. 5, 1951 |
| 2,737,015 | Wright | Mar. 6, 1956 |
| 2,865,176 | Skellern | Dec. 23, 1958 |
| 2,936,969 | Griffith et al. | May 17, 1960 |

FOREIGN PATENTS

| | | |
|---|---|---|
| 617,729 | Great Britain | Feb. 10, 1949 |
| 722,065 | Great Britain | Jan. 19, 1955 |